(12) United States Patent
Uneme et al.

(10) Patent No.: US 6,275,024 B1
(45) Date of Patent: Aug. 14, 2001

(54) DEVICE FOR ELECTRONICALLY TRANSFORMING DISPLACEMENT OF AUTOMOBILE ACCELERATOR LEVER

(75) Inventors: Masato Uneme; Masaya Goto; Yasuhiko Kunita; Akehito Sugiura; Ayamitsu Amano, all of Nagoya (JP)

(73) Assignee: Chuo Hatsujo Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 09/176,937

(22) Filed: Oct. 22, 1998

(30) Foreign Application Priority Data

Oct. 22, 1997 (JP) .................................................. 9-289675
Oct. 21, 1998 (JP) ................................................ 10-299906

(51) Int. Cl.[7] .................................................... G01B 7/14
(52) U.S. Cl. ...................... 324/207.17; 324/226; 123/349
(58) Field of Search ........................ 324/207.17, 207.18, 324/207.19, 226; 123/349, 361, 399, 612, 617; 74/512; 73/862.625

(56) References Cited

U.S. PATENT DOCUMENTS 4,112,885 * 9/1978 Iwata et al. ........................ 123/361
5,563,355 * 10/1996 Pluta et al. ...................... 73/862.625

* cited by examiner

Primary Examiner—Walter E. Snow
(74) Attorney, Agent, or Firm—Sughrue, Mion, Zinn, Macpeak & Seas, PLLC

(57) ABSTRACT

In a device for electronically transforming displacement of automobile accelerator lever, an accelerator pedal and a return member are provided, the latter of which returns the accelerator lever back to an original position. A detector device is provided to detect a displacement of the accelerator lever to generate an electrical signal. The detector device has a magnetic plunger which mechanically moves in association with the accelerator lever, and further has primary and secondary coils to surround the magnetic plunger so that the magnetic plunger mechanically moves therethrough. The primary coil is energized to detect an electromotive force produced from the secondary coil. A housing encloses the plunger, and the primary and secondary coils. An engagement piece is fixed to the accelerator lever to actuate a switch which detects whether or not the accelerator pedal is stepped.

10 Claims, 9 Drawing Sheets

DEVICE FOR ELECTRONICALLY TRANSFORMING DISPLACEMENT OF AUTOMOBILE ACCELERATOR LEVER

BACKGROUND OF THE INVENTION

1. Field of the Invention

The invention relates to a device for electronically transforming displacement of automobile accelerator lever well-suited to accelerating and deaccelerating a motor vehicle.

2. Description of the Prior Art

In a motor vehicle, an accelerator lever is usually mounted on a floor of a driver's seat to adjust an output power from an internal combustion engine. The accelerator lever is connected to a mechanical accelerator device which has a wire cable and a linkage mechanism. The mechanical type accelerator device has an assemble of many return springs and friction members so that the accelerator lever can receive a stepping force in response to a displacement of an accelerator pedal.

On the other hand, an electronic accelerator device has been introduced so that a detector device transforms the displacement of the accelerator pedal into an electronic signal to control the engine by way of ECU. The trouble with the accelerator device is that it requires a detector having slidable contacts, a friction cable to transmit a stepping force to the accelerator lever and a mechanism necessary to give a return force to the accelerator lever.

However, in either of the accelerator devices, it needs an increased number of component parts with a complicated structure, thus requires time-consuming assemble processes to a motor vehicle while occupying a larger space necessary to assemble the component parts. Because of the slidable contacts more likely to be worn with the passage of serving time, the problem with the electronic accelerator device is considered to a durability.

Therefore, the present invention has made with the above drawbacks in mind, it is a main object of the invention to provide an accelerator lever structure for an electronic type accelerator device which is capable of quickly assembling the component parts with a simplified structurewhile requiring only a limited space occupancy to assemble the component parts to a motor vehicle.

SUMMARY OF THE INVENTION

According to the present invention, there is provided a device for electronically transforming displacement of automobile accelerator lever comprising: an accelerator lever having an accelerator pedal; a return member provided to return the accelerator lever back to an original position; a detector member provided to detect a displacement of the accelerator lever to generate an electrical signal; the detector member comprising: a magnetic body which mechanically moves in association with the accelerator lever; primary and secondary coils wound around the magnetic body in a direction in which the magnetic body mechanically moves; and the primary coil being energized to detect an electromotive force produced from the secondary coil.

With the detector member incorporated into a single cylinder-and-plunger assemble unit, it is possible to forthwith mount the detector member on between the accelerator lever and a front floor of a driver's seat of a motor vehicle.

With the detector member and the return member incorporated into the single cylinder-and-plunger assemble unit, it is possible to minimize an entire structure while reducing a space occupancy necessary to assemble the component parts to the motor vehicle.

With a relatively small structure, it is possible to adjust a stepping force against the accelerator pedal.

With no sliding contacts provided herein, it is possible to enhance the durability with no substantial wear.

With the use of dual plungers, it is possible to cope with a failure of the detector system by comparing outputs based of displacements of the two plungers.

BRIEF DESCRIPTION OF THE DRAWINGS

A preferred form of the present invention is illustrated in the accompanying drawings in which.

DETAILED DESCRIPTION OF THE PREFERRED EMBODIMENTS

Figure 1:
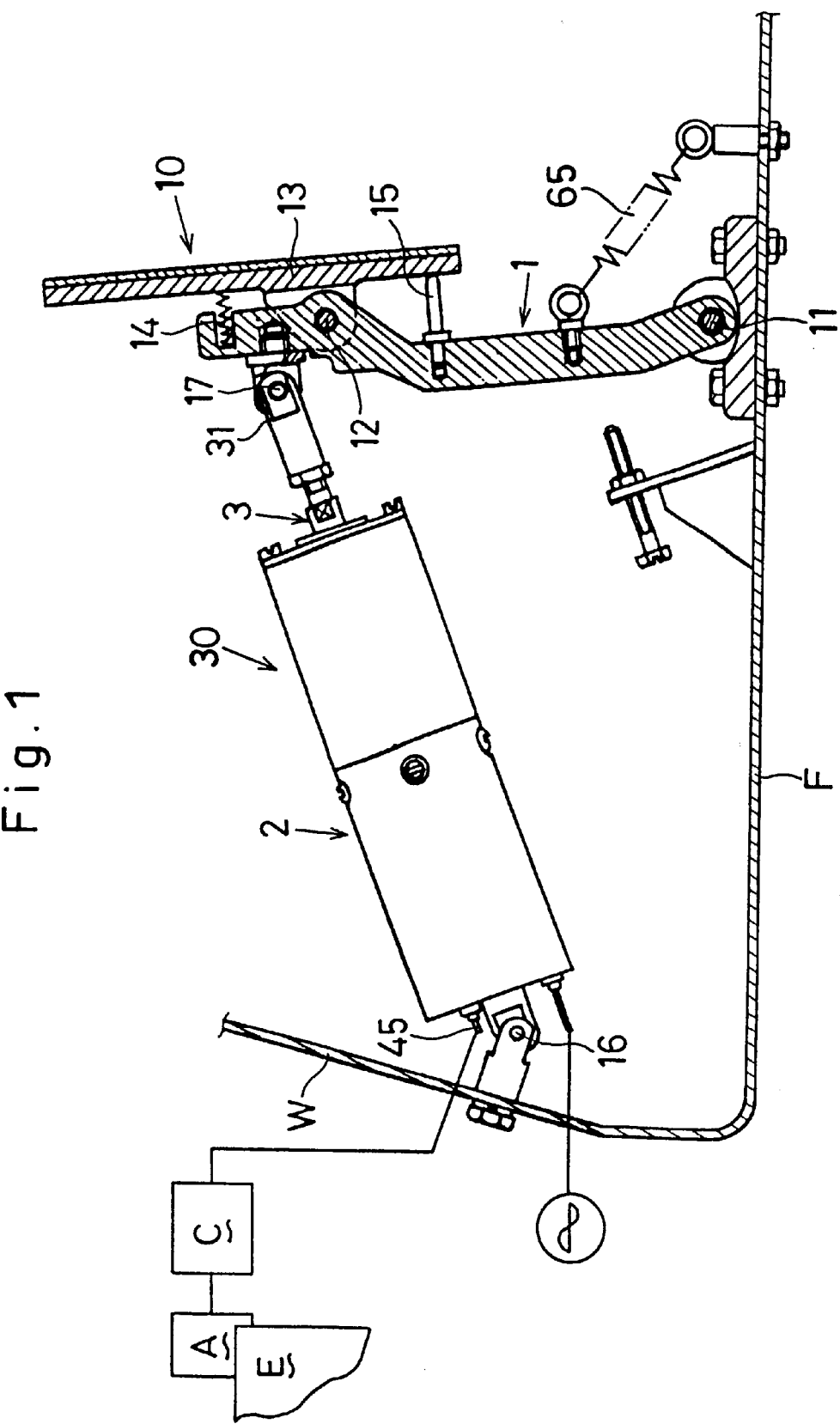
FIG. 1 is a longitudinal cross sectional view of an accelerator lever structure according to a first embodiment of the invention.
Figure 2:
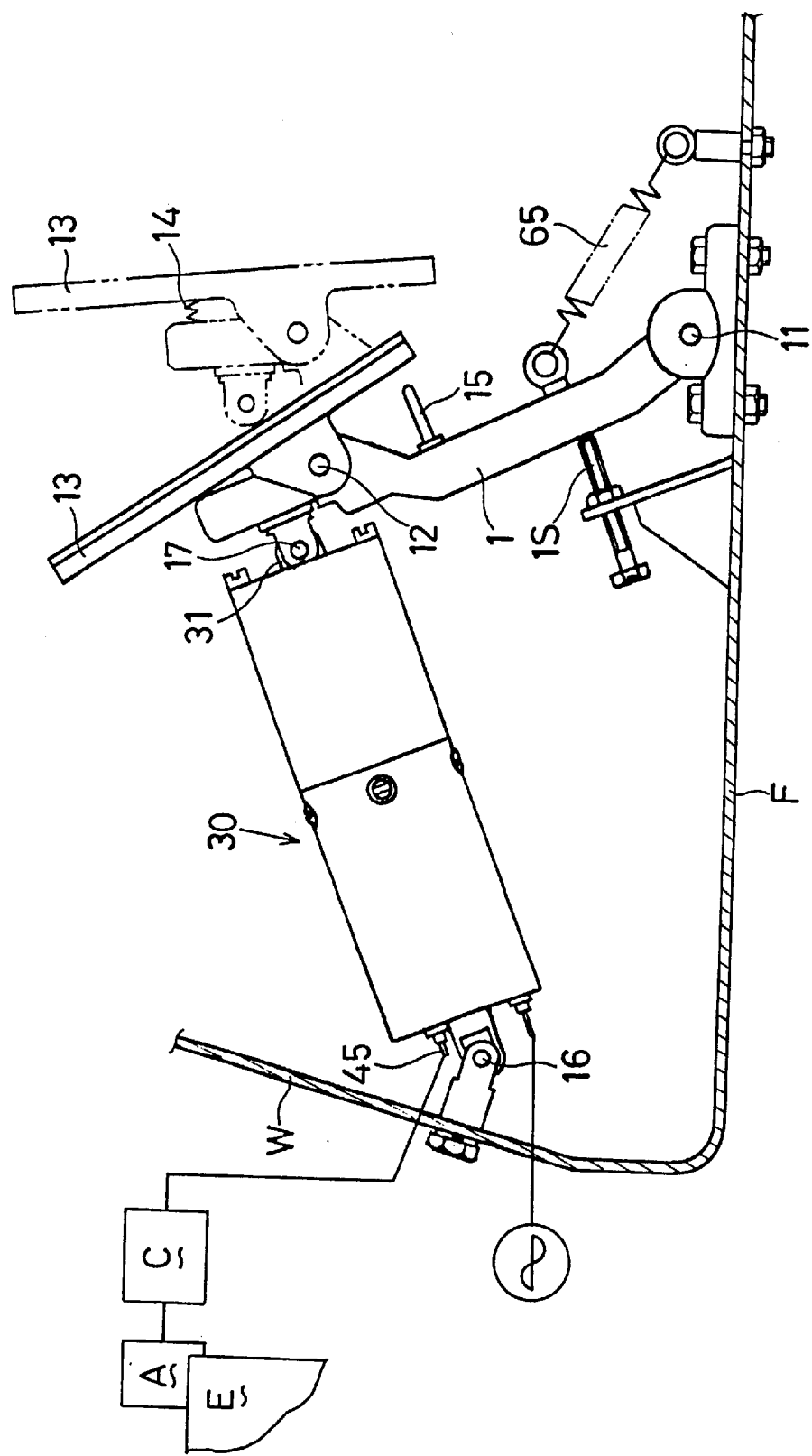
FIG. 2 is a side elevational view of the accelerator lever structure.
Figure 3:
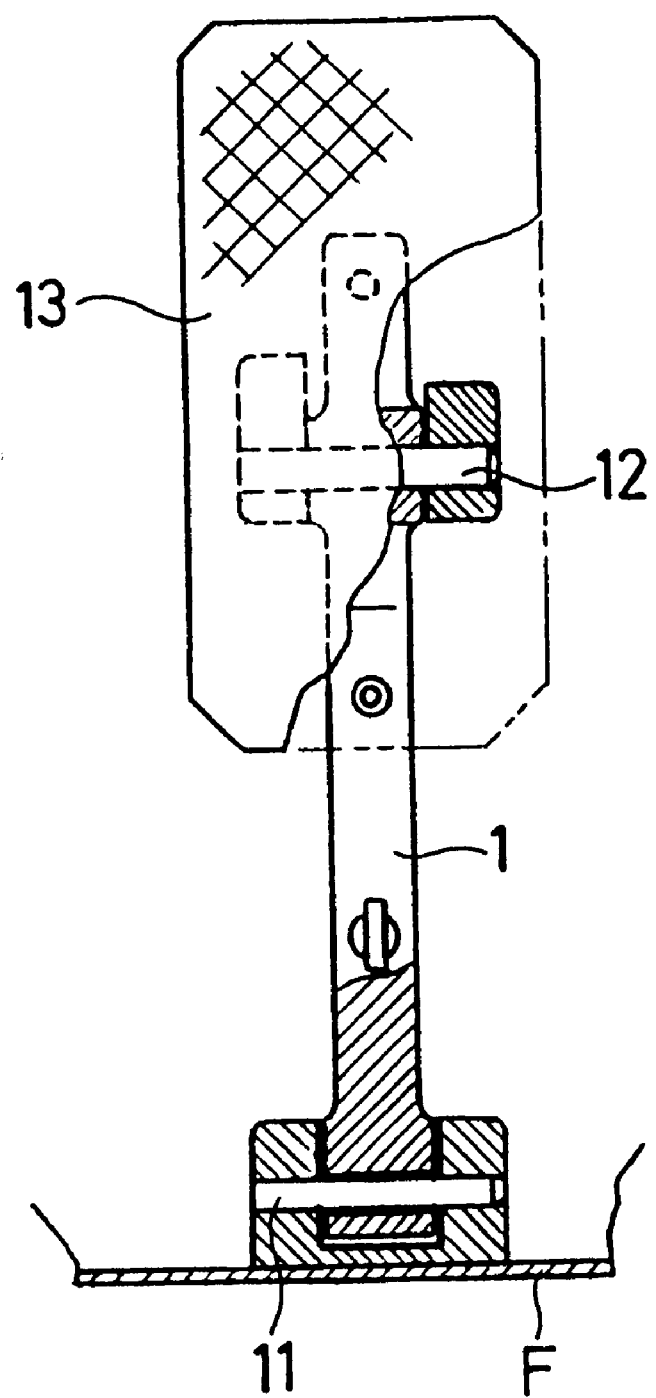
FIG. 3 is a partly cross-sectioned view of an accelerator lever.

Referring to FIGS. 1 through 3 which show an electronic lever structure for electronically transforming displacement of automobile accelerator lever 10 according to the present invention, the acceleration lever structure 10 is mounted on a front floor F of a driver's seat, the floor F of which continuously extends from a partition wall W of an engine room (not shown). An accelerator device A is attached to an internal combustion engine E to adjust an amount of fuel and aerial component supplied appropriately therto. When an electric motor vehicle is adopted herein instead of the internal combustion engine E, the accelerator device A is designed to control an intensity of current supplied to an electric motor.

An engine control computer C forms an electronic accelerator mechanism to control the accelerator device A. To the engine control computer C, fed are an output from the accelerator lever structure 10, outputs from an accelerator sensor, vehicular velocity sensor, air-intake temperature sensor coupled with an on-off signal from an air conditioner. In this instance, the output from the accelerator lever structure 10 is represented by a displacement of an accelerator pedal 13 or a rotational angle of an accelerator lever 1.

In the accelerator lever structure 10, the accelerator lever 1 is pivotably connected to the floor F by means of a pin 11, and the accelerator pedal 13 is pivotably connected to an upper end of the accelerator lever 1 by means of another pin 12. To the accelerator lever 1, a helical coil spring 14 is attached to urge the accelerator pedal 13 always to rotationally move it in the clockwise direction. And a stopper 15 is provided to block the accelerator pedal 13 from rotationally moving beyond a predetermined angular region. Notation 1S designates another stopper to block the accelerator lever 1 from rotationally moving beyond a predetermined angular region.

In this situation, the accelerator lever 1 may be made in integrtal with the accelerator pedal 13. The accelerator lever 1 may be rotationally pivoted at one end on the partition wall W in which the accelerator pedal 13 is located below the accelerator lever 1. A lower portion of the accelerator pedal 13 may be rotationally pivoted to the floor F, and an upper portion of the accelerator pedal 13 may engage with a lower portion of the accelerator lever 1.

Between the upper portion of the accelerator lever 1 and the partition wall W, a cylinder-and-plunger assemble unit 30 is provided in which a plunger 3 is located within a housing 2. In this instance, the housing 2 is made of a ferromagnetic material, and pivotably connected at one end to the partition wall W by means of a pin 16. Whereas the housing 2 is not necessarily made of a ferromagnetic material.

The plunger 3 is made of a ferromagnetic iron bar. On a right end of the plunger 3, a connector portion 31 is provided to pivotably connect it to the upper portion of the accelerator lever 1 by way of a pin 17. In this way, the plunger 3 is adapted to axially move in association with the rotational movement of the accelerator lever 1. In this situation, one end of the plunger 3 may be rotationally connected to the partition wall W, and one end of the housing 2 may be rotationally connected to the accelerator lever 1.

Figure 4:
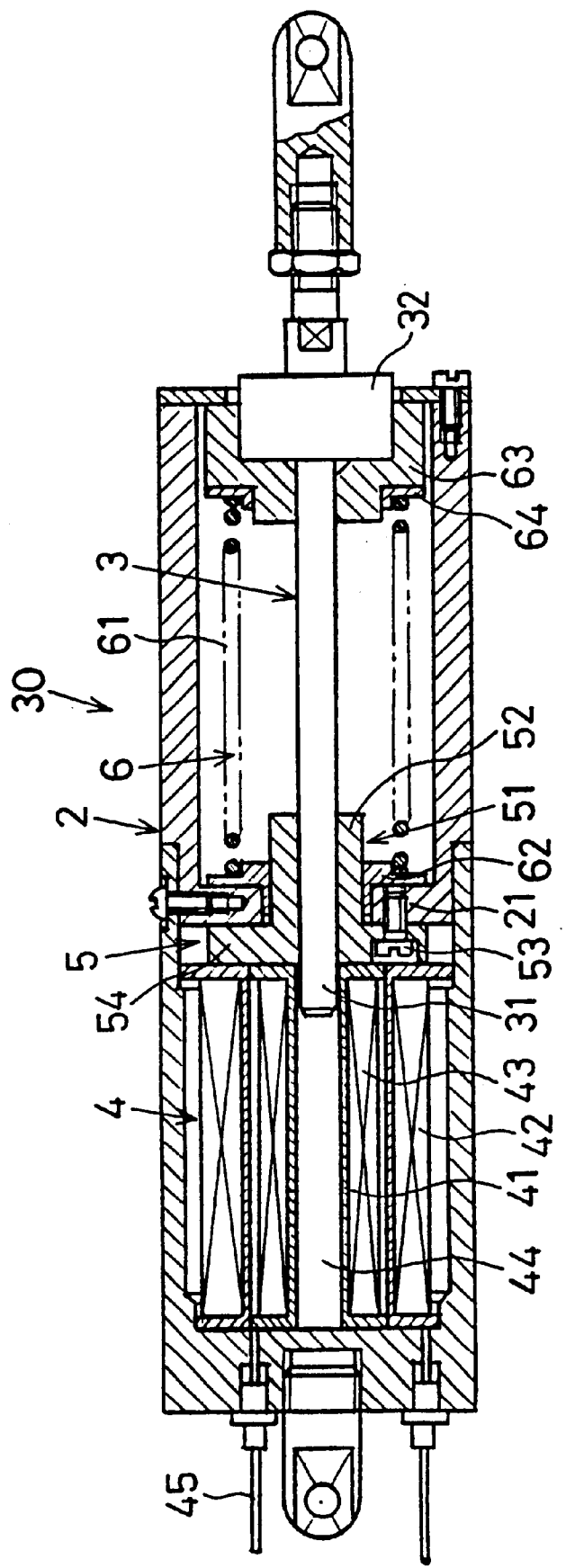
FIG. 4 is a longitudinal cross sectional view of an assemble of a cylinder and plunger structure.
Figure 5:
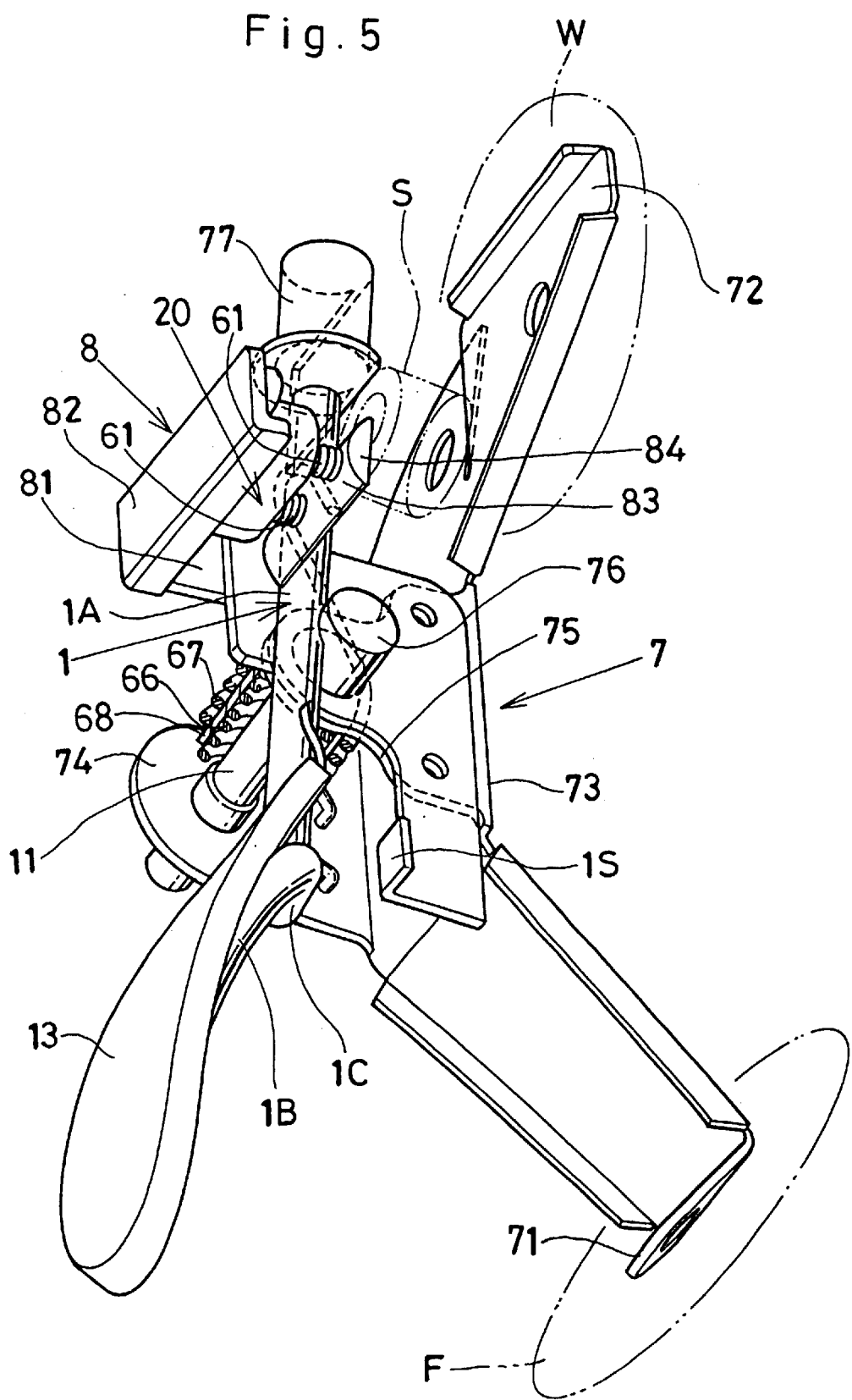
FIG. 5 is a perspective view of an accelerator lever structure according to a second embodiment of the invention.
Figure 6:
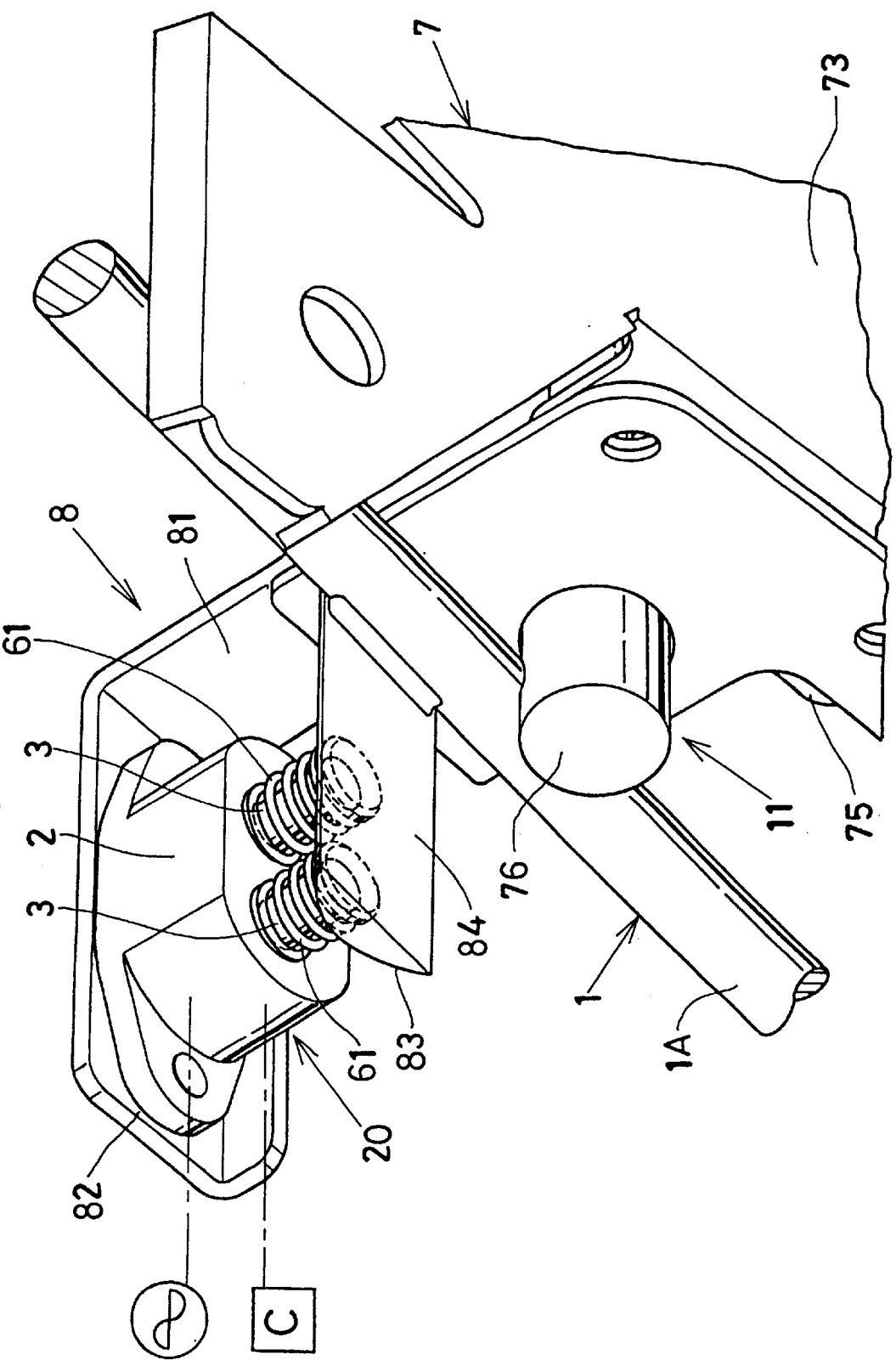
FIG. 6 is a enlarged perspective view of a main portion of the accelerator lever structure.

As shown in FIG. 4, incorporated with the cylinder-and-plunger assemble unit 30 are a detector member 4 to generate an electronic signal in response to a displacement of the accelerator pedal 13, a frictional resistance member 5 to impart an appropriate friction against the sliding movement of the plunger 3, and a return member 6 to return the plunger 3 and the accelerator lever 1.

The detector member 4 has a bobbin 41 coaxially accommodated within a left side of the hosing 2. A primary coil 42 is wound around the bobbin 41 and a secondary coil 43 is placed within the primary coil 42. To the primary coil 42, an alternate current is supplied, and an inner space of the bobbin 41 an accommodation space 44 in which the plunger 3 axially moves. In response to the displacement of the accelerator pedal 13, a front end 31 of the plunger 3 penetrates deeper into the accommodation space 44. An output terminal 45 of the secondary coil 43 is connected to the computer C.

In the detector member 4, a coupling rate between an electrical fluxes of the primary coil 42 and those of the secondary coil 43 changes in association with the displacement of the plunger 3 due to the plunger 3 being made of the ferromagnetic material. When stepping the accelerator pedal 13 deeper as shown in FIG. 2, the plunger 3 penetrates far into the accommodation space 44 in association with the rotational movement of the accelerator lever 1. As a result, an intensity of a magnetic field established by energizing the primary coil 42 increases with the deeper penetration of the plunger 3 to induce an electromagnetic force the secondary coil 43. By detecting an intensity the electromagnetic force, it is possible to detect the displacement of the accelerator lever 1 i.e., stepping degree of the accelerator pedal 13.

With the detector member 4 normally working devoid of the slidable contacts, it is possible to prolong the service life with no substantial amount of wear. It is also possible to precisely control the output power of the engine since the output varies staunchly in linear proportion to the displacement of the accelerator pedal 13 (rotational angle of the acceleration lever 1). With the cylinder-and-plunger assemble unit 30 located between the floor F (partition wall W) and the accelerator lever 1, it is possible to minimize an entire structure while reducing a space occupancy necessary to assemble the component parts to the motor vehicle.

In so doing, a wall 21 is provided at a middle portion of the housing 2 of the cylinder-and-plunger assemble unit 30. The wall 21 has the frictional resistance member 5 which is made by a synthetic mold resin 51 to impart a frictional resistance against the plunger 3 when the plunger 3 moves. The mold resin 51 has a tubular portion 52 provided to surround the plunger 3, and having a flange portion 54 fixed between the wall 21 and the bobbin 41 by means of a screw 53. With the frictional resistance member 5 thus provided by the synthetic mold resin 51, it is possible to decrease the number of component parts with a compact structure.

Within a right side space of the housing 2, a helical coil spring 61 is provided to urge the plunger 3 against the accelerator lever 1 to serve as a return member 6. One end of the spring 61 engages with the wall 21 by way of a washer 62, and the other end of the spring 61 engages with a rubber lid 63 (by way of a washer 64) which is attached to a head portion 32 of the plunger 3.

The helical coil spring 61 acts an urging member to return the plunger 3 and the accelerator lever 1. With the spring 61 incorporated into the housing 2, it is possible to decrease the number of component parts necessary for the return member 6 while reducing a space occupancy needed to assemble the component parts to the motor vehicle.

Considering that the frictional resistance member 5 exerts a friction enough to surpass the returning force of the spring 61, a tensile helical spring 65 is additionally provided between the floor F and the accelerator lever 1 as shown in FIG. 1. With the spring 65 thus provided, it is possible to compensate the helical coil spring 61 to sustain the entire function with a high reliability particularly when the spring 61 is in trouble. As an alternative of the spring 61, an extensible member (liquid spring) may be provided which is encapsulated with a compressible liquid.

Figure 7:
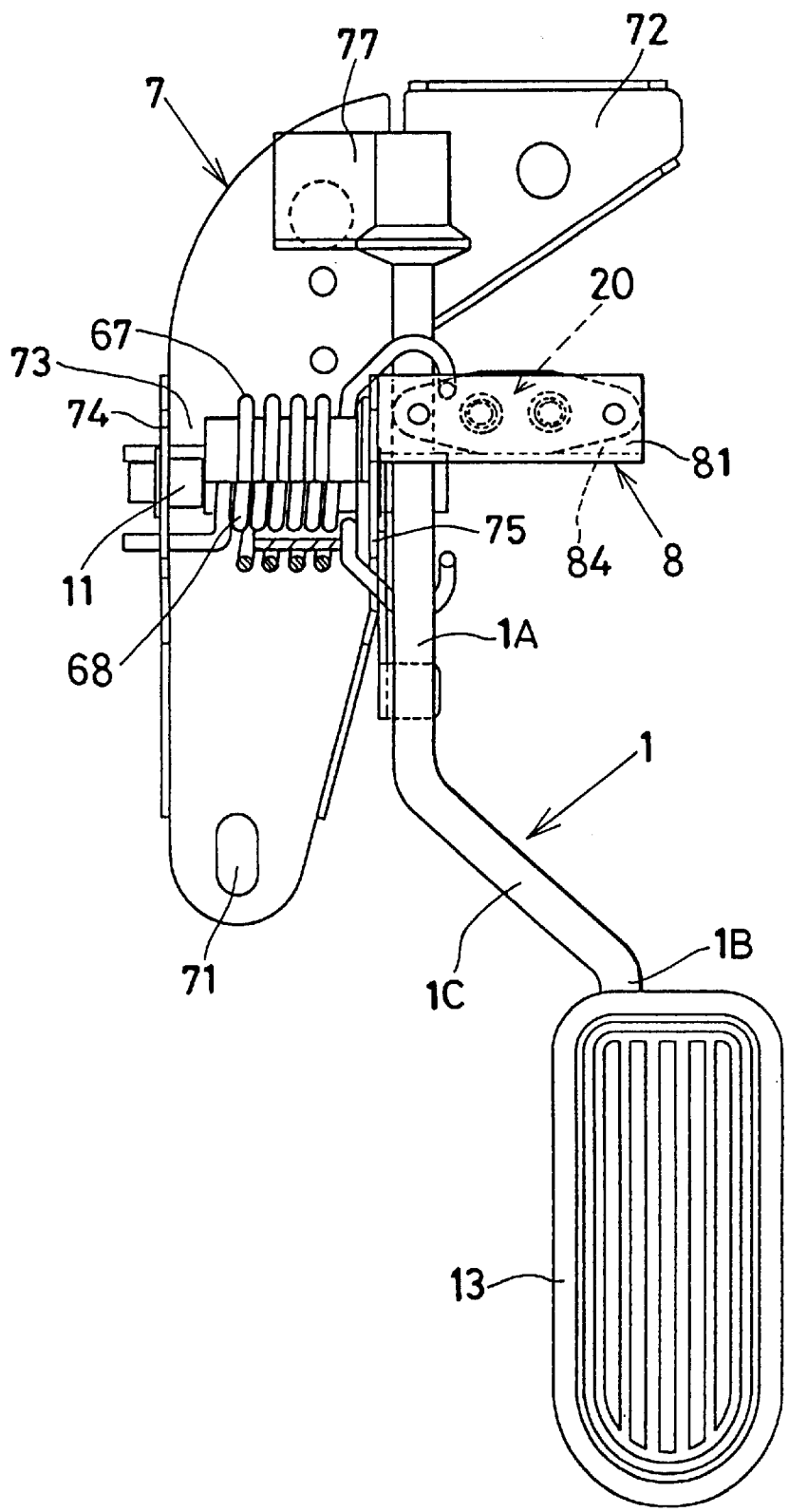
FIG. 7 is a plan view of the accelerator lever structure.
Figure 8:
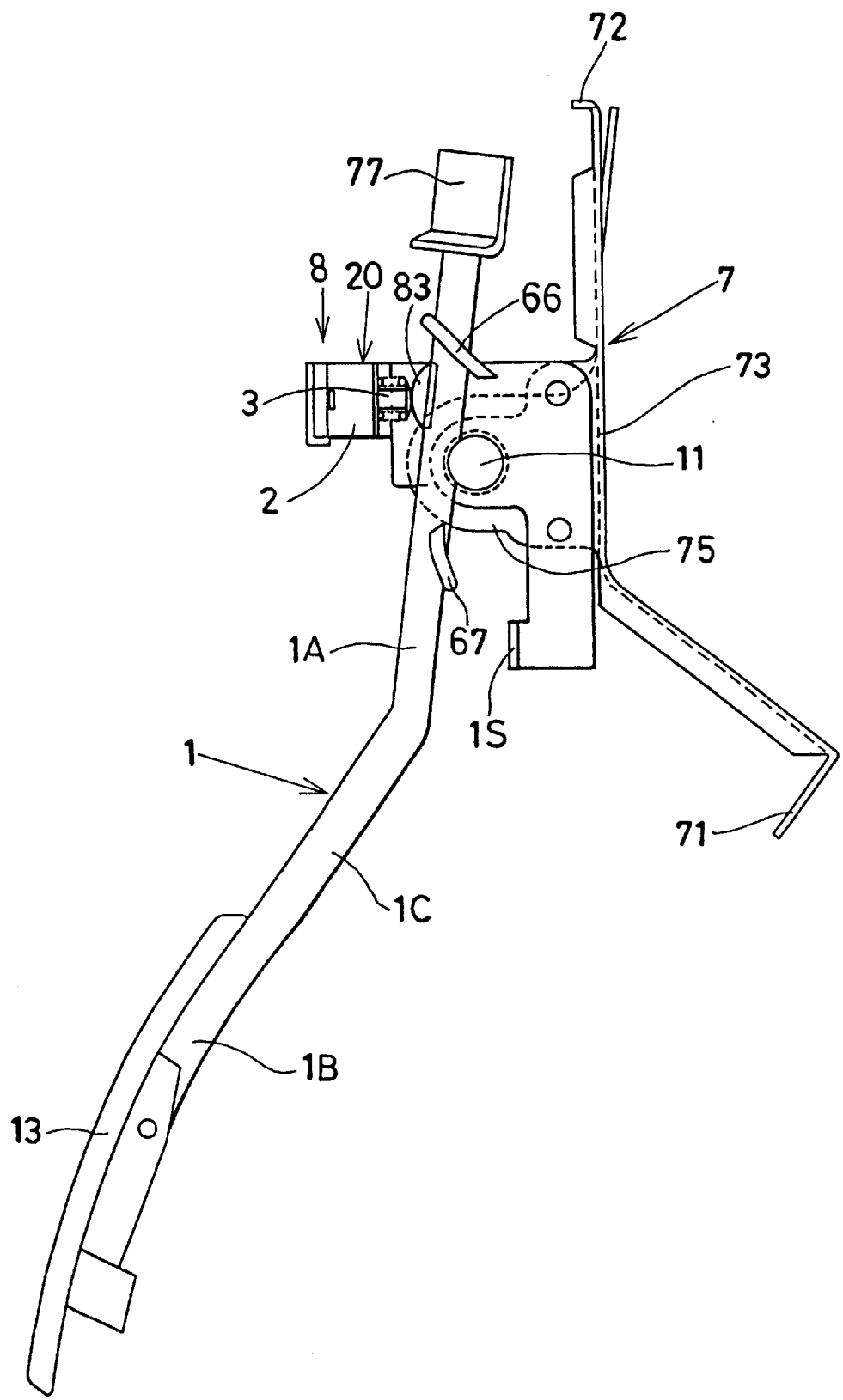
FIG. 8 is a side elevational view of the accelerator lever structure.

FIGS. 5 through 9 show a second embodiment of the invention in which the accelerator lever 1 is pivotably disposed at a pin 11 which is supported by a bracket 7 fixed to the floor F and the partition wall W. The bracket 7 is bent into an inverted L-shaped configuration as a whole in accordance with shapes of the floor F and the partition wall W (FIG. 7). By means of connectors (not shown), the bracket 7 is connected to the floor F and the partition wall W at its ends 71, 72.

A middle portion 73 of the bracket 7 is elevated upward, and crosswise sides of the middle portion 73 are bent vertically to form stud walls 74, 75 respectively, across which the pin 11 extends to be supported. A right end of the pin 11 extends outside the stud wall 75 to form a lever connector 76.

The accelerator lever 1 is made of an iron bar, a middle portion of which is angularly bent by 45 degrees twice in a zigzag fashion. As result, the accelerator lever 1 has an upper section 1A, a lower section 1B and a crosswise section 1C which is in a slantwise relationship with the upper and lower sections 1A, 1B. The accelerator pedal 13 is attached to an extremity of the lower section 1B, and an engagement piece 77 is fixed to an extremity of the upper section 1A to actuate a switch S which detects whether or not the accelerator pedal 13 is stepped. The upper section 1A of the accelerator lever 1 firmly attached crosswisley to the lever connector 76 by means of welding or the like.

Around the pin 11, an inner torsional spring 66 is encircled, and an outer torsional spring 67 is coaxially encircled around the spring 66 by way of a partition tube 68. One end of the inner torsional spring 66 engages with the stud wall 74, and the other end of the spring 66 is hooked to the upper section 1A over the lever connector 76. One end of the outer torsional spring 67 engages with the stud wall 74, and the other end of the spring 67 is hooked to the upper section 1A under the lever connector 76.

To the stud wall 75, a detector bracket 8 is provided which is bent generally to form an inversed L-shaped configuration. The detector bracket 8 has a side arm 81 and a lateral arm 82 provided to extend across the upper section of the accelerator lever 1. The side arm 81 is fixed to the stud wall 75, and the lateral arm 82 is positioned to accommodate the detector member 20 as clearly shown FIG. 6.

Figure 9:
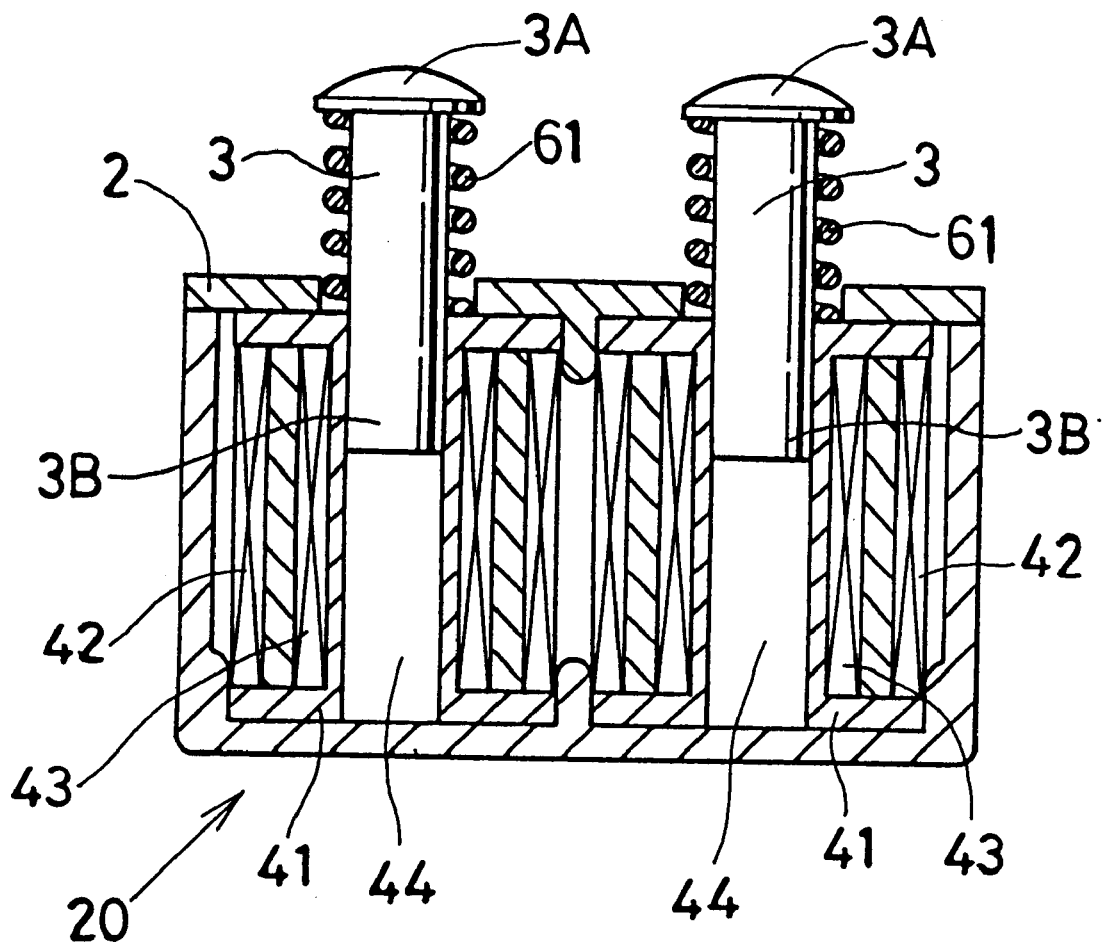
FIG. 9 is a longitudinal cross sectional view of a cylinder-and-plunger assemble unit.

The detector member 20 has the housing 2 elliptical in section and two plunger 3 disposed in parallel within the housing 2. The housing 2 and the plunger 3 are made of the ferromagnetic material, and the housing 2 has a detection member which transform the displacement of the accelerator pedal 13 into an electrical signal. A front extremity of the plunger 3 has a semi-spherical flange head 3A. Between the flange head 3A and a side wall of the housing 2, the helical coil spring 61 is provided to return the plunger 3 back to the initial position. In this situation, a lower end 3B of the plunger 3 is located within the accommodation space 44 as shown in FIG. 9.

To a middle of the upper section 1A of the accelerator lever 1, an operation plate 84 is welded in parallel with the lateral arm 82 of the detection bracket 8. In association with rotational movement of the accelerator lever 1 around the pin 11, the operation plate 84 pushes the semi-spherical flange head 3A upward through a curved surface 83 to penetrate the plungers 3, 3 deeper into the housing 2. The penetration degree of the plungers 3, 3 changes the intensity of the electrical field caused by the primary coil 42 within the accommodation space 44 so as to establish the electromotive force through the secondary coil 43. By detecting the intensity of the electromotive force, it is possible to recognize the displacement of the accelerator lever 1 i.e., a stepping degree of the accelerator pedal 13.

In this instance, a lower reach of the accelerator lever 1 is to be determined to be dimensionally longer than an upper reach of the accelerator lever 1 with the lever connector 76 at a fulcrum point. This makes it possible to detect the rotational movement of the accelerator lever 1 with a smaller displacement of the plungers 3, 3 against the stepping degree of the accelerator pedal 13. This lead to making the detector member 20 compact.

To each of the plungers 3, 3 disposed in parallel within the housing 2, the primary and secondary coils 42, 43 are wound respectively. The flange heads 3A, 3A of the plungers 3, 3 move in sync with the operation plate 84, and the electrical signals to detect the displacement of the acceleration lever 1 are generated separately from the two secondary coils 43.

The electrical signals generated separately from the two secondary coils 43 are fed to the computer C. When judged that the two signals are unidentical, a warning is triggered as a failure of the detector system. This makes it possible to enhance safety and reliability of the electronic type accelerator device.

It is to be noted the number of the plungers is not only two but three, four or more as required under certain conditions.

While there has been described what is at present thought to be preferred embodiments of the invention, it will be understood that modifications may be therein and it is intended to cover in the appended claims all such modifications which fall within the scope of the invention.

What is claimed is:

1. A device for electronically transforming displacement of an automobile accelerator lever, comprising:
   an accelerator lever having an accelerator pedal;
   a return member provided to return said accelerator lever back to an original position;
   a detector member provided to detect a displacement of said accelerator lever to generate an electrical signal;
   said detector member comprising:
      a plurality of magnetic plungers that mechanically move, respectively, in association with said accelerator lever;
      primary and secondary coils wound around each of said magnetic plungers in a direction in which said magnetic plungers mechanically move, respectively;
      said primary coil being energized to detect an electromotive force produced from said secondary coil;
      a housing into which the plurality of plungers and said primary and secondary coils are incorporated;
      a stud wall including brackets having ends each fixed to a partition wall and a front wall;
      the stud wall having a pin on which said accelerator lever is crosswisely placed against said pin, one end of which has said accelerator pedal and the other end of which engages with said plurality of plungers in order to move said plungers together when said accelerator pedal is stepped with said pin at a fulcrum; and
      an engagement piece fixed to said accelerator lever to actuate a switch which detects whether or not said accelerator pedal is stepped.

2. The device for electronically transforming displacement of an automobile accelerator lever as recited in claim 1 wherein said accelerator lever is connected at one end to said front floor through a pin and connected at the other end to said accelerator pedal through a pin, and said accelerator lever engages against a stopper to cease a forward movement of said accelerator lever, said accelerator level being always urged rearward by a torsional spring.

3. The device for electronically transforming displacement of an automobile accelerator lever as recited in claim 1, wherein a middle portion of said bracket is elevated upward, and crosswise sides of said middle portion are bent vertically to form said stud walls across said pin, respectively.

4. The device for electronically transforming displacement of an automobile accelerator lever as recited in claim 1 wherein said accelerator lever is to rotationally pivot at its fulcrum, and said housing forms cylinders in which said plungers are placed, and helical coil springs are provided in said cylinders to urge said plungers toward their original positions.

5. The device for electronically transforming displacement of an automobile accelerator lever as recited in claim 4 wherein a synthetic resin layer is molded inside said cylinders to supply a frictional resistance to said plungers when said plungers reciprocally move.

6. A device for electronically transforming displacement of an automobile accelerator lever, comprising:
   an accelerator lever having an accelerator pedal;
   a return member provided to return said accelerator lever back to an original position;
   a detector member provided to detect a displacement of said accelerator lever to generate an electrical signal;

said detector member comprising:
- a magnetic plunger that mechanically moves in association with said accelerator lever;
- primary and secondary coils wounds around said magnetic plunger in a direction in which said magnetic plunger mechanically moves;
- said primary coil being energized to detect an electromotive force produced from said secondary coil;
- a housing into which the plunger and said primary and secondary coils are incorporated;
- a stud wall including brackets having ends fixed to a partition wall and a front wall;
- the stud having a first pin on which said accelerator lever is crosswisely placed against said first pin, one end of which has said accelerator pedal and the other end of which engages with said plunger in order to move said plunger together when said accelerator pedal is stepped with said first pin at a fulcrum; and
- an engagement piece fixed to said accelerator lever to actuate a switch which detects whether or not said accelerator pedal is stepped.

7. The device for electronically transforming displacement of an automobile accelerator lever as recited in claim 6 wherein said accelerator lever is connected at one end to said front floor through a second pin and connected at the other end to said accelerator pedal through a third pin, and said lever engages against a stopper to cease a forward movement of said accelerator lever, said level being always urged rearward by a torsional spring.

8. The device for electronically transforming displacement of an automobile accelerator lever as recited in claim 6 wherein a middle portion of said bracket is elevated upward, and crosswise sides of said middle portion are bent vertically to form said stud walls across said first pin respectively.

9. The device for electronically transforming displacement of an automobile accelerator lever as recited in claim 6 wherein said accelerator lever is to rotationally pivot at its fulcrum, and said housing forms a cylinder in which said plunger is placed, and a helical coil spring is provided in said cylinder to urge said plunger toward its original position.

10. The device for electronically transforming displacement of an automobile accelerator lever as recited in claim 9 wherein a synthetic resin layer is molded inside said cylinder to supply a frictional resistance to said plunger when said plunger reciprocally moves.

* * * * *